United States Patent [19]

Ellegaard

[11] 4,448,455
[45] May 15, 1984

[54] RELEASABLE AUXILIARY WHEEL COUPLING MECHANISM

[76] Inventor: Peer Ellegaard, Lundemarken 16, Himmelev, 4000 Roskilde, Denmark

[21] Appl. No.: 380,737

[22] PCT Filed: Feb. 11, 1981

[86] PCT No.: PCT/DK81/00012
    § 371 Date: May 13, 1982
    § 102(e) Date: May 13, 1982

[87] PCT Pub. No.: WO82/01687
    PCT Pub. Date: May 27, 1982

[30] Foreign Application Priority Data

Nov. 20, 1980 [DK] Denmark .......................... 4949/80

[51] Int. Cl.³ .................. B60B 11/00; B60B 15/26
[52] U.S. Cl. ......................... 301/36 R; 301/40 S; 403/348
[58] Field of Search ............. 301/36 R, 38 R, 39 R, 301/40 S, 37 TP, 37 S; 403/348

[56] References Cited

U.S. PATENT DOCUMENTS 2,614,001 10/1952 Rycroff ........................... 301/37 S
3,894,774 7/1975 Bonomo ......................... 301/38 R X
4,127,305 11/1978 Nielsen ............................. 301/36 R
4,131,323 12/1978 Dietrich, Sr. ..................... 301/36 R
4,351,568 9/1982 Ahlschwede ..................... 301/36 R

FOREIGN PATENT DOCUMENTS 200942 5/1958 Austria .............................. 301/40 S
21649 1/1981 European Pat. Off. .
448052 1/1913 France ............................. 301/38 R
25816 11/1907 Sweden ............................ 301/36 R Primary Examiner—David A. Scherbel
Attorney, Agent, or Firm—Laubscher, Philpitt & Laubscher

[57] ABSTRACT

A mechanism for releasably coupling an auxiliary wheel with an original wheel of a vehicle is disclosed, characterized by a cylindrical coupling member upon which the auxiliary tire is mounted. The cylindrical member contains a plurality of cutouts in one edge thereof and a plurality of tightening devices adjacent the cutouts. A plurality of locking cams are secured to the rim of the original wheel. The tightening devices of the coupling member are adapted to releasably interlock with the locking cams on the original wheel rim to releasably couple the auxiliary wheel with the original wheel.

6 Claims, 3 Drawing Figures

RELEASABLE AUXILIARY WHEEL COUPLING MECHANISM

TECHNICAL FIELD

This invention relates to a releasable coupling system or coupling one or more additional wheels to the original wheels of a vehicle.

BACKGROUND ART

Tractors often are equipped with extra wheels, so-called dual wheels, when working in fields where it is desirable to distribute the weight of the tractor over a large surface so that the earth in the wheel tracks does not become too heavily compressed. A further advantage of dual wheels is that tractors driving through muddy fields do not get stuck so easily, the tractive force being transferred via a larger wheel surface.

Quite a number of systems for releasable coupling of an extra wheel to an original wheel are known. In Danish patent specification No. 139.617, for instance, a coupling system is described consisting of a number of inter-acting locking cams and clamps in the form of knee-action mechanisms distributed along the periphery of the wheel, the mechanisms being fastened to the original rim and to the dual rim, respectively. However, these known coupling systems are complicated mechanisms calling for extremely accurate alignment of the dual wheel and the original wheel before assembly in the axial direction of the wheels. As there is often question of very large and heavy dual wheels, the alignment process obviously calls for either additional equipment, which means increased cost, or more operators. Furthermore, the tractive force is transferred from the original wheel to the dual wheel solely through the relatively sensitive coupling arrangements, and it has become apparent that the coupling known from Danish patent specification No. 139,617, in the case of relatively large wheels, can only be used for short periods before having to be replaced or repaired.

Furthermore, from the Danish patent No. 136,889 a tightening mechanism is known for securing extra wheels on the original wheels of a vehicle. The tightening mechanism consists of at least three angle levers rotatably placed in a hub device releasably fastened to the extra rim, and furthermore at their free ends the angle levers are provided with a hook arranged to engage into locking cams secured to the original rim, in which cams holes are provided corresponding to the hooks, when the levers are rotated about their mentioned center of rotation by turning a hand wheel helically engaged in said angle levers.

So, by turning the hand wheel the hooks at the free ends of the angle levers are pressed radially into the holes of the locking cams while fastening the dual wheel to the original wheel.

This construction also calls for an exact alignment as the hooks of the angle levers have to be opposite the holes in the locking cams on the original rim, and thus the use of extra equipment or more operators for this work will be required. Moreover, it is a substantial disadvantage that the tractive force has to be transferred from the original wheel to the dual wheel through the locking cams and the rotatably embedded angle levers. Therefore, the shakings or jolts occurring during the driving will cause loosening of the angle levers and the locking cams which had been tightened by the hand wheel.

DISCLOSURE OF INVENTION

An object of the invention is to provide a coupling system whereby additional wheels can be coupled to the original wheels without previous accurate alignment and without the use of extra equipment, only one or two operators being required using simple hand tools such as a screw spanner or possibly an open-end spanner. Furthermore, it should be possible to use the coupling system in cases where wheels have different rims, as long as they have the same tire diameter.

This object is achieved according to the invention by a coupling system of the kind mentioned in the introduction characteristic in that it comprises a mainly cylindrical annular plate or member arranged to abut on a tire edge or similarly at the rim edge of the original wheel and the rim edge of the dual wheel, and in that a number of locking cams are fastened to the original rim and placed in the peripheral direction of the rim distributed thereon, the cams being arranged to interact with corresponding tightening devices fastened on the annular plate which is secured to the rim of the dual wheel in a suitable way, for instance secured thereon by welding or the like.

By using an annular plate which is arranged to abut on, for instance, a tire edge at the rim of the original wheel and the rim of the dual wheel, a very stable and rigid coupling is achieved, in relation to the known coupling systems, as the vertical reactive forces stemming from the dual wheel are transferred along the entire periphery of the rims and not just transferred to a few sections along the periphery. During the mounting, the abutment of the annular plate upon the original rim provides excellent support during radial alignment of the annular plate, and the dual wheel fastened thereon in advance can, in a relatively simple way, be turned in position in the peripheral direction, and then the interacting locking cams on the original rim and the tightening devices on the annular plate can easily by coupled together. Thus, the extra wheel can be mounted on the original wheel without having to remove the same from the vehicle or to modify it in any other way other than to place the necessary locking cams, preferably by welding.

In a preferred embodiment of a coupling system according to the invention, the tightening devices are designed as a slide having at its one end a hook and at its other end a threaded hole, the slide being placed in a bushing and held therein by means of a screw extending through an opening in the bushing and screwed in said threaded hole with its head abutting the outer surface of the bushing. The coupling together of the annular plate and the original rim can thus be performed in a simple manner, as the screw heads in normal fashion are turned using a conventional hand tool when the hooks of the slide are positioned opposite the locking cams, thereby leading the slide axially in a direction towards the dual wheel until the hook is in locked engagement with the locking cam. The necessary tightening force can then be obtained by a suitable tightening of the screw received by the threaded hole of the slide. As the dual wheels are not equipped with a rim plate, there is easy access to the screw heads situated immediately below the inner surface of the annular plate.

According to the invention, a helical spring may be placed between the slide and the bottom of the bushing.

Thereby it is achieved that the slide will be led back towards the original rim when the screws are loosened again upon dismounting the dual wheel.

In yet another preferred embodiment of a coupling system according to the invention, one cutout, opening outwards, is made in the annular plate opposite each hook and locking cam, the cutout having an extension in the peripheral direction of the annular plate which corresponds to the width of the locking cam and the tightening hook, and having a depth that corresponds to the thickness of the locking cam. In this manner, the mounting can take place in an even simpler manner as all the operator need do is to ensure that the cutouts in the annular plate are led in over the locking cams in such a way that the tightening hook and the locking cam are placed side by side in the peripheral direction of the annular plate, when the edge of the annular plate abuts the rim of the original wheel.

Then the annular plate is turned in relation to the original wheel until the tightening hook is opposite the locking cam. This turning takes place in an extremely simple way, as the edge of the annular plate all the time is guided by the tire edge at the edge of the original rim.

According to the invention, the locking cam may be provided with a groove open towards the original rim, said groove having a complementary form to the hook of the slide. This form ensures a firm securing of the slide in the locking cam, thereby guaranteeing that the slide and thus the annular plate cannot turn in relation to the original wheel, as forces in the peripheral direction of the wheels are absorbed by abutment of the tightening hook upon the lateral surfaces of the groove.

By letting the grooves in the locking cam have lateral surfaces divergingly inclined outwardly towards the original rim, as suggested according to the invention, an even simpler mounting is achieved, as a slightly slanting placing of the hook of the slide in relation to the groove in the locking cam will be compensated for when the screw is tightened, inasmuch as the hook will slide against the inclined surface and thereby be pulled into place before it reaches the bottom of the groove of the locking cam.

The width of the cutouts in the annular plate can, according to the invention, be measured in such a way that the one side surface of the locking cam abuts the side edge of the cutout, when the tightening hook is opposite the complementary groove in the locking cam. In this manner the turning movement of the annular plate can be made automatically to stop at the precise moment when the tightening hook is opposite the opening in the locking cam.

In a possible embodiment of a coupling system according to the invention, the annular plate is fastened to the rim of the dual wheel by means of inter-acting sets of locking cams and tightening devices on the rim and on the annular plate, respectively. In this manner, the dual wheel may be used as a spare wheel, as it will be possible to mount same on the hub of a vehicle by using an appropriate rim plate. Furthermore, the releasable fastening of the annular plate to the rim of the dual wheel implies that the two parts can be kept separately, in order to eliminate the danger of damaging the annular plate or the tightening hooks fastened thereon, if the dual wheel for some reason or other should fall.

BRIEF DESCRIPTION OF THE DRAWING

In the following, the invention will be further explained with reference to the drawing, where.

BEST MODE OF CARRYING OUT THE INVENTION

Figure 1:
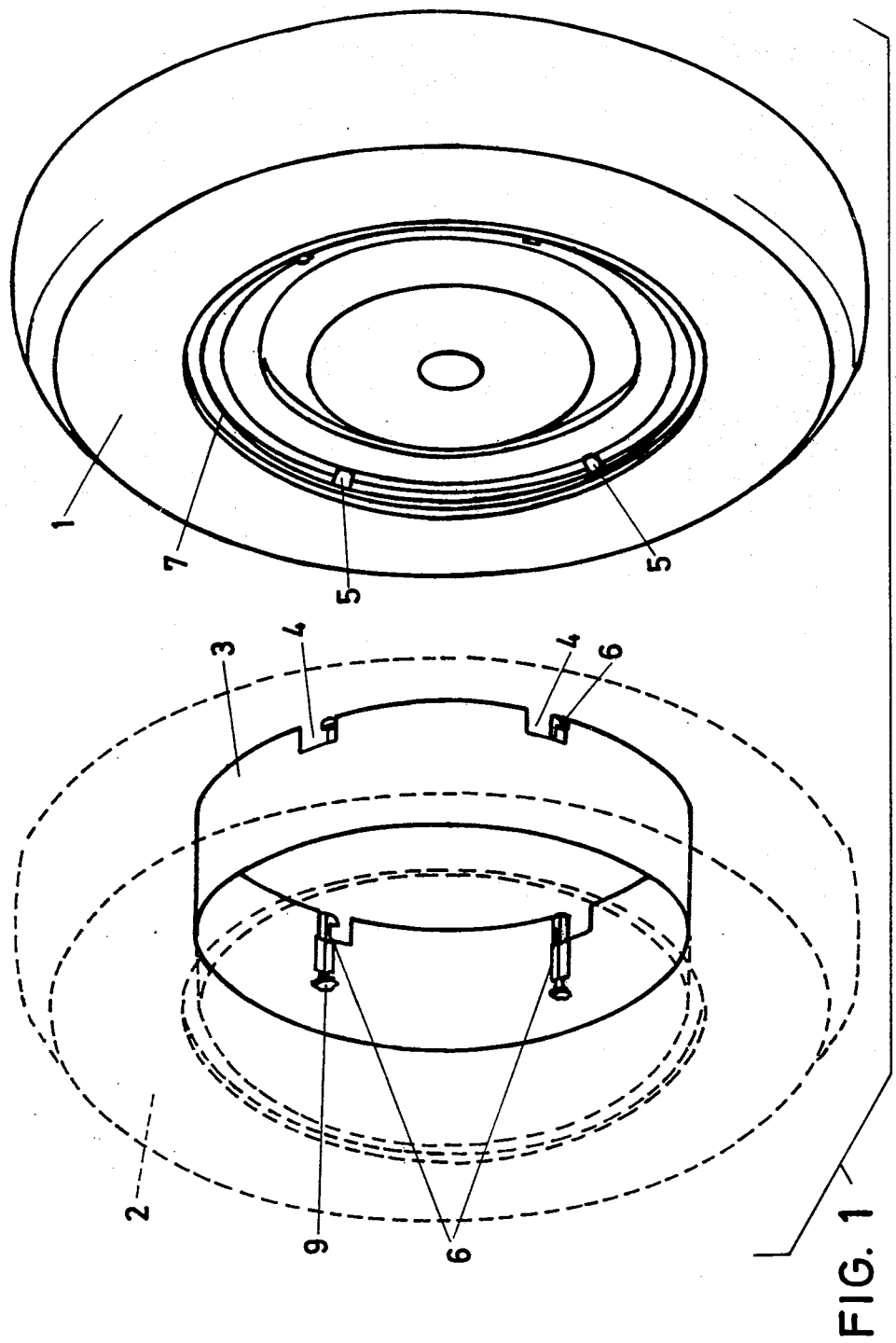
FIG. 1 shows an exploded view in perspective of a coupling system designed according to the invention.

FIG. 1 shows a coupling system according to the invention for coupling together an original wheel 1 and a dual wheel 2. The coupling system comprises a mainly cylindrical annular plate or member 3 arranged to abut the tire edge 7 at the rim edge of the original wheel and to abut the corresponding tyre edge (not shown on the drawing) of the dual wheel. The coupling-together is provided by a number of tightening devices, four in the shown embodiment, being distributed along the periphery of the wheels, and comprising a locking cam 5 welded to the original rim and a tightening hook 6 fastened on the annular plate 3. Opposite the tightening hooks 6 outwardly open cutouts or recesses 4 are made in the annular plate, and the function of the cutouts will be further explained below.

Figure 2:
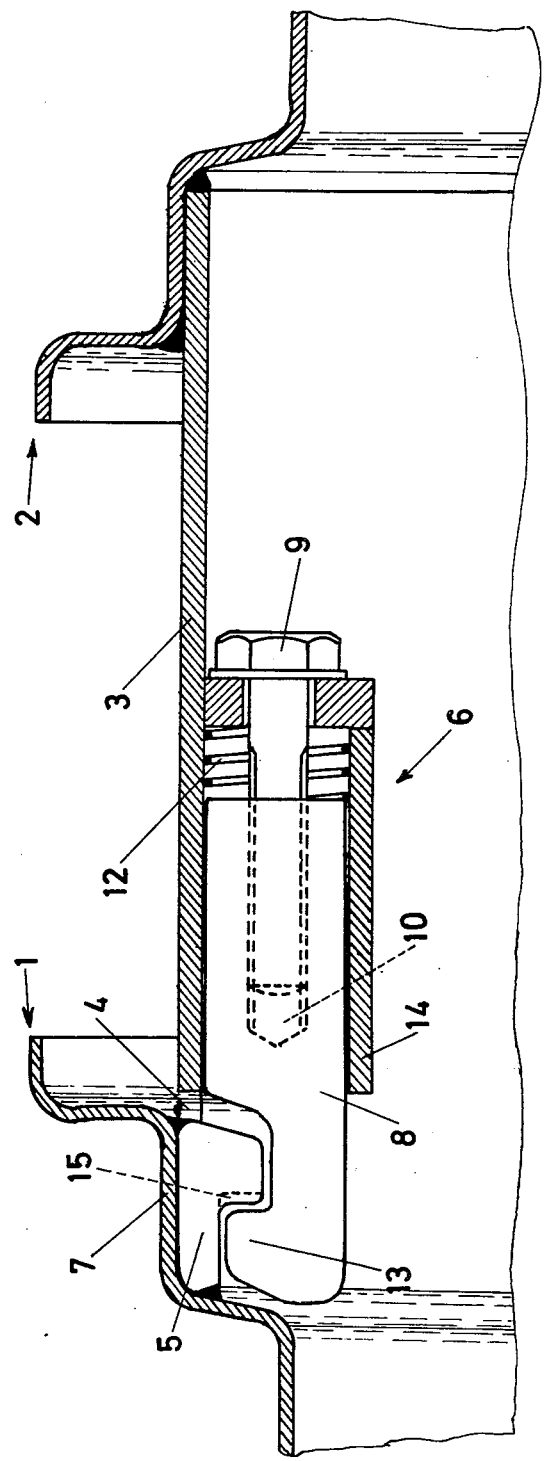
FIG. 2 is an axial section through the annular plate and the tightening hook fastened thereon and placed between an original rim and the rim of a dual wheel.

FIG. 2 shows in a larger scale an axial section through the upper part of an original wheel 1 and a dual wheel 2 coupled together. As shown, the annular plate 3 is welded to the rim of the extra wheel or dual wheel 2, while the annular plate 3 is releasably secured to the rim of the original wheel 1 by means of interaction between the locking cam 5 being welded to the rim of the original wheel, and the hook 6. The tightening hook 6 comprises a slide 8 being provided at its one end with a hook 13 and at the other end with a threaded hole 10 in which a screw 9 is received, the screw being led through an opening in the bottom of a bushing 14, which is arranged to receive the slide 8 and is attached to the annular plate 3, for instance by welding. In the case of the embodiment shown on the drawing, the bushing is made by a so-called RHS-profile, which at its one end is closed by a base welded thereon.

Figure 3:
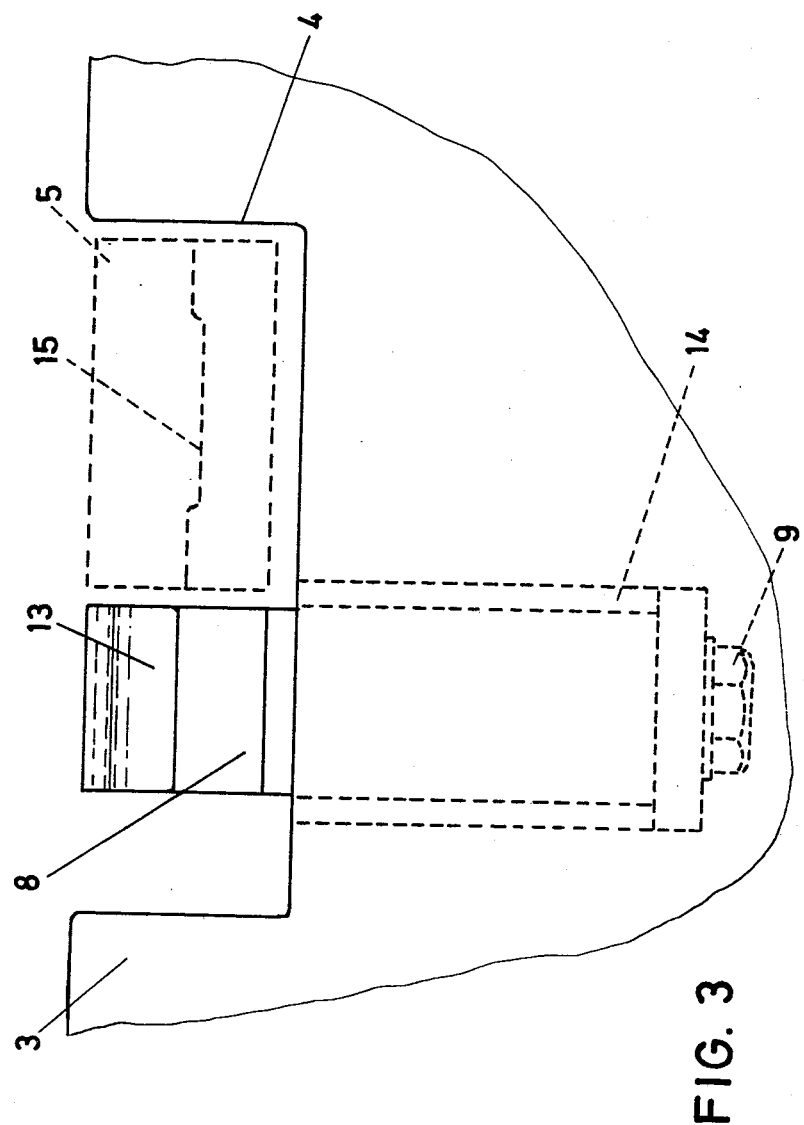
FIG. 3 is a top view of the annular plate and the tightening hook fastened thereon and placed against the original rim with said hook placed next to the locking cam on the original rim in the peripheral direction of the wheels.

The interaction between the tightening hook 6 and the locking cam on the rim of the original wheel is clearly shown in FIG. 3, illustrating the system seen from above. In the illustration shown in FIG. 3, the tightening hook and the annular plate are in abutment upon the tire edge on the rim of the original wheel, the cutout 4 in the annular plate 3 being led in over the locking cam 5 and with the slide 8 of the tightening hook 6 situated next to the locking cam 5. By turning the annular plate 3 in relation to the original wheel rim the hook 13 is led on the slide 8 in under the locking cam 5, and by tightening the screw 9 the hook 13 is pulled into the groove 15 in the locking cam 5, thereby providing the tightening of the annular plate 3 and the original rim. As it appears from FIG. 3, the tightening hook 6 and thereby the annular plate 3 are secured against turning in the peripheral direction as a consequence of the abutment upon the side surface of the groove 15.

The spring 12 shown in FIG. 2, which is placed concentrically around the screw 9 between the bottom of the bushing 14 and the end surface of the slide 8, serves to drive the slide 8 free of the engagement with the groove 15 in the locking cam, when the screw 9 is loosened when removing the dual wheel.

The invention is not restricted to the features just shown and described, and it should especially be noted, that using a coupling system according to the invention, it will be possible to couple together a number of extra wheels, in principle any number. Furthermore, the width of the annular plate may be varied at will, and thus the distance between the original wheel and the extra wheel can be changed according to actual requirements.

I claim:

1. Apparatus for releasably coupling an auxiliary wheel (2) with the rim of an original wheel (1) of a vehicle, comprising
   (a) a cylindrical hollow member (3) having an outer diameter corresponding with the diameter of the original wheel rim, one end of said member being connected with the auxiliary wheel;
   (b) a plurality of locking cams (5) secured to the original wheel rim in circumferentially spaced relation;
   (c) a plurality of tightening devices arranged on said member adjacent the other end thereof, said tightening devices being arranged in circumferentially spaced relation corresponding with the spacing of said locking cams, each of said tightening devices including
      (1) a bushing (14) secured to said member
      (2) a slide member (8) arranged within said bushing for reciprocal displacement relative thereto, one end of said slide member containing a threaded bore (10) and the other end of said slide member including a hook portion (13) adapted for interlocking engagement with one of said locking cams;
      (3) screw means (9) connected with said bushing, the threaded portion of said screw means being arranged within said threaded bore, said screw means being operable to displace said slide member within said bushing; and
      (4) helical spring means (12) arranged about said screw means and between said bushing and said slide member, whereby when said slide member hook portions of said fastening devices are interlocked with said locking cams, respectively, and when said screw means are operated to tighten said hook portions against said locking cams, the auxiliary wheel is connected with the original wheel.

2. Apparatus as defined in claim 1, wherein said cylindrical member contains a plurality of cutouts (4) in said other end, each of said cutouts corresponding with one of said tightening devices and having a peripheral extent corresponding with the width of said locking cam and said slide hook portion and a depth corresponding with the thickness of said locking cam.

3. Apparatus as defined in claim 2, wherein each of said locking cams includes a groove (15) adapted to receive said corresponding tightening device hook portion.

4. Apparatus as defined in claim 3, wherein said groove includes lateral surfaces divergingly inclined outwardly toward the rim of the original wheel.

5. Apparatus as defined in claim 3, wherein the width of each of said cutouts is such that the lateral surface of the corresponding locking cam abuts the lateral surface of the corresponding cutout when said tightening device is opposite said corresponding locking cam groove.

6. Apparatus for releasably coupling an auxiliary wheel (2) with the rim of an original wheel (1) of a vehicle, comprising
   (a) a cylindrical hollow member (3) having an outer diameter corresponding with the diameter of the original wheel rim, one end of said member being connected with the auxiliary wheel and the other end of said member containing a plurality of circumferentially spaced cutouts;
   (b) a plurality of locking cams (5) secured to the original wheel rim in circumferentially spaced relation corresponding with the spacing of said member cutouts, each of said locking cams including a groove; and
   (c) a plurality of tightening devices connected with said member in alignment with said cutouts, respectively, said cutouts being adapted to receive said grooved locking cams for releasable interlocking with said tightening devices, respectively, the width of each of said cutouts being such that the lateral surface of the corresponding locking cam abuts the lateral surface of the corresponding cutout when said said tightening device is opposite said corresponding locking cam groove.

* * * * *